No. 860,415. PATENTED JULY 16, 1907.
M. M. SEAY.
ANIMAL POKE.
APPLICATION FILED FEB. 6, 1907.
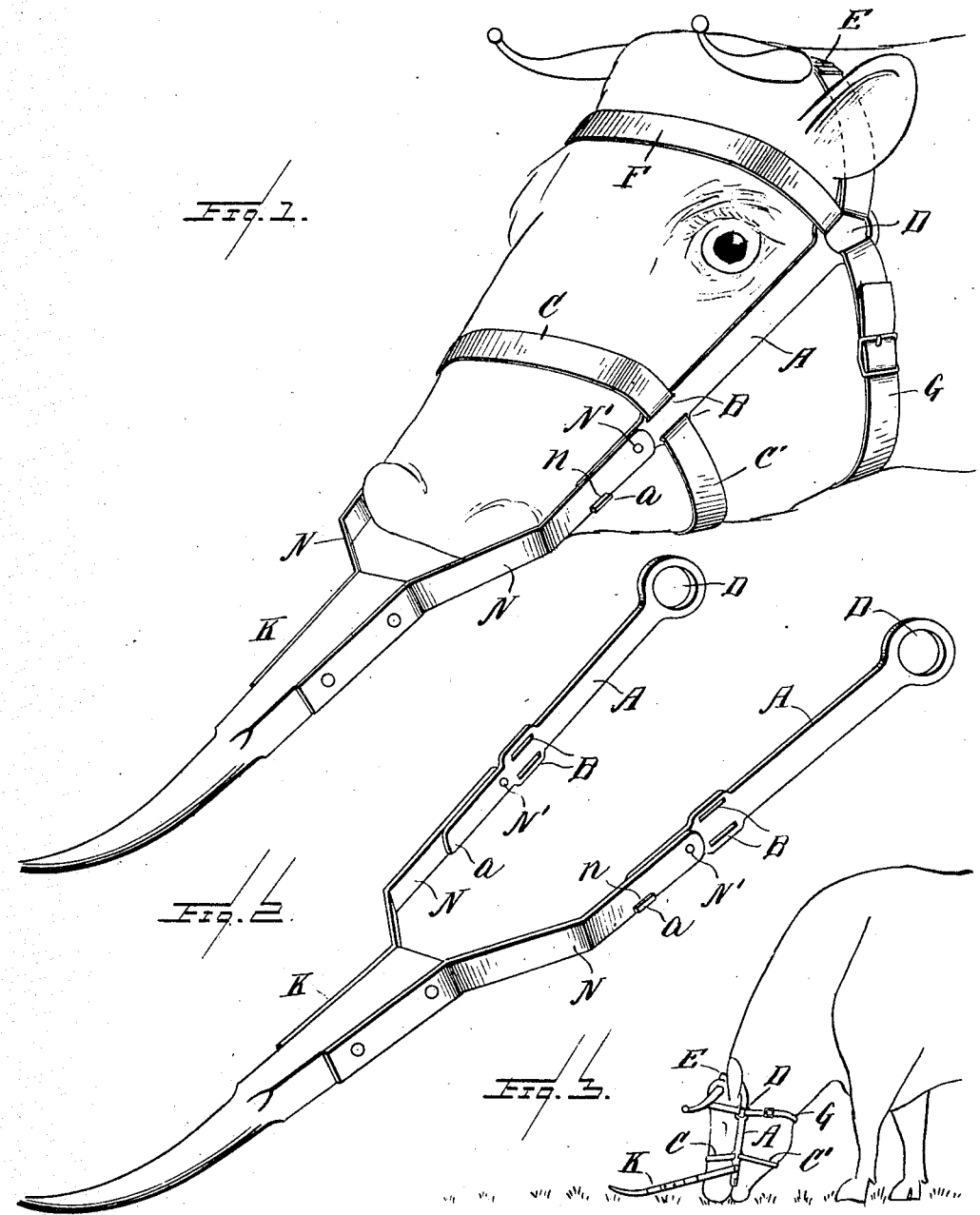

UNITED STATES PATENT OFFICE.

MARK MACHEL SEAY, OF BLOSSOM, TEXAS.

ANIMAL-POKE.

No. 860,415.  Specification of Letters Patent.  Patented July 16, 1907.

Application filed February 6, 1907. Serial No. 356,093.

*To all whom it may concern:*

Be it known that I, MARK MACHEL SEAY, a citizen of the United States, residing at Blossom, in the county of Lamar and State of Texas, have invented certain new and useful Improvements in Animal-Pokes; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in animal pokes, and the object of the invention is to produce a simple and efficient device of this character which may be applied to the head of an animal and so arranged that it will effectually prevent the animal from jumping and at the same time afford means whereby the animal may readily feed without interference.

The invention comprises various details of construction and combinations and arrangements of parts which will be hereinafter fully described and then specifically defined in the appended claims.

My invention is illustrated in the accompanying drawings, in which:—

Figure 1 is a perspective view showing my animal poke as applied to the head of an animal. Fig. 2 is an enlarged perspective view of the device detached from the head of an animal, and Fig. 3 is a side elevation showing the position that the poke bar would assume when an animal having the poke attached thereto is feeding.

Reference now being had to the details of the drawings by letter, A, A designate two bars which are separate from each other and each is provided with slots B for the reception of the nose and chin straps C and C', respectively. The free ends of said bars have apertures D for the reception of the strap E which passes about the head of the animal in the manner shown in the drawings and the straps F and G, the former of which is adapted to pass over the forehead of the animal while the latter is adapted to pass under the throat.

K designates a poke bar, the forward end of which is curved, as shown clearly in the drawings, and N, N designate two angled strips which fastened to opposite sides of said poke bar, form a yoke and each of said strips N is pivotally connected at N' to a bar A. Each of said bars A has a lug *a* projecting from the outer face of each adjacent to one end thereof and each of the strips N has a slight cut-away portion *n* upon corresponding edges adapted to receive said lug and said lug being designed to limit the movement of said strips N in one direction.

A distinctive feature of my invention comprises the apparatus shown and described in which a bit connection is dispensed with which is adapted to be held in the mouth of the animal, thus making it inconvenient for the animal as well as uncomfortable in eating or grazing.

In applying my improved poke to the head of an animal, the bars A are held along the opposite sides of the face, a sufficient space intervening between the two strips N forming the yoke so as not to interfere with the nose of the animal. When the animal equipped with my improved poke lowers its head to graze, the curved point of the poke bar coming into contact with the ground will cause the same to be thrown into the position shown in Fig. 3, thereby enabling the animal to freely feed or graze.

Having thus fully described my invention, what I claim as new and desire to secure by Letters Patent, is:—

An animal poke comprising two bars terminating at their upper ends in eyes adapted to receive straps for attachment to the head of an animal, said bars having widened portions provided with parallel slots therein, and the forward ends of the bars bent laterally forming hooks, a yoke comprising a shank portion having angled bars fixed to the opposite flat faces thereof, pivot pins carried by said slotted bars adjacent to the slots therein and upon which the arms of said yoke are pivotally mounted and adapted to engage said hooks, and means passing through said slots for holding the forward ends of the slotted bars against the head of an animal, as set forth.

In testimony whereof I hereunto affix my signature in the presence of two witnesses.

MARK MACHEL SEAY.

Witnesses:
J. W. WILLIAMS,
D. P. SEAY.